(12) United States Patent
Chen et al.

(10) Patent No.: US 10,464,494 B2
(45) Date of Patent: Nov. 5, 2019

(54) ROOF LUGGAGE RACK AND VEHICLE WITH THE SAME

(71) Applicant: WINBO-Dongjian Automotive Technology Co., Ltd., Foshan, Guangdong (CN)

(72) Inventors: Yongbo Chen, Guangdong (CN); Zhihai Zhang, Guangdong (CN); Wei Huang, Guangdong (CN); Weiting He, Guangdong (CN); Zhuen Yang, Guangdong (CN)

(73) Assignee: WINBO-Dongjian Automotive Technology Co., Ltd., Foshan, Guangdong (CN)

( * ) Notice: Subject to any disclaimer, the term of this patent is extended or adjusted under 35 U.S.C. 154(b) by 39 days.

(21) Appl. No.: 15/834,094

(22) Filed: Dec. 7, 2017

(65) Prior Publication Data

US 2018/0162286 A1 Jun. 14, 2018

(30) Foreign Application Priority Data

Dec. 9, 2016 (CN) .......................... 2016 1 1129399

(51) Int. Cl.
*B60R 9/04* (2006.01)
(52) U.S. Cl.
CPC ..................... *B60R 9/04* (2013.01)
(58) Field of Classification Search
CPC .................. B60R 9/04; B60R 9/058
USPC .......................... 224/309, 325–327; 296/210
See application file for complete search history.

(56) References Cited

U.S. PATENT DOCUMENTS

| | | | | |
|---|---|---|---|---|
| 4,156,497 A | * | 5/1979 | Bott .......................... | B60R 9/04 224/326 |
| 2016/0297370 A1 | * | 10/2016 | Kim .......................... | B60R 9/04 |
| 2017/0015253 A1 | * | 1/2017 | Shibata ..................... | B60J 10/36 |

FOREIGN PATENT DOCUMENTS

| | | |
|---|---|---|
| CN | 203126698 U | 8/2013 |
| JP | H03164342 A | 7/1991 |
| JP | H04119247 U | 10/1992 |
| JP | H04119248 U | 10/1992 |
| JP | 09095185 A * | 4/1997 |
| JP | 2003262210 A * | 9/2003 |
| JP | 2004203123 A * | 7/2004 |

OTHER PUBLICATIONS

English Translation of JP 09095185 from espacenet.com, accessed Mar. 11, 2019.*

* cited by examiner

*Primary Examiner* — Scott T McNurlen
(74) *Attorney, Agent, or Firm* — Andrew C. Cheng

(57) ABSTRACT

The present disclosure provides a roof luggage rack for a vehicle. The roof luggage rack includes a luggage rack body defining a mounting hole; a fastener fixing the luggage rack body on a roof of the vehicle; and a mounting cover engaged in the mounting hole to seal the luggage rack body.

15 Claims, 5 Drawing Sheets

ROOF LUGGAGE RACK AND VEHICLE WITH THE SAME

CROSS REFERENCE TO RELATED APPLICATIONS

This application claims priority to Chinese Patent Application No. 201611129399.9 filed on Dec. 9, 2016, which is hereby incorporated by reference herein as if set forth in its entirety.

TECHNICAL FIELD

This disclosure relates generally to the field of automobile spare parts, and more particularly, to a roof luggage rack for a vehicle and a vehicle with a roof luggage rack.

BACKGROUND

Typically, most vehicles have as a feature a luggage rack superposed the roof of the vehicle. The luggage rack is mounted on the roof of the vehicle by known fastening devices. However, the manner of the installation of the luggage rack may interfere with the appearance or may be complex.

SUMMARY

The present disclosure provides a roof luggage rack in order to solve the problems of the installation and the aesthetic appearance at the same time.

In order to resolve the above-mentioned technical problems, the present disclosure provides a roof luggage rack for a vehicle. The roof luggage rack may comprise a luggage rack body defining a mounting hole, a fastener fixing the luggage rack body on the vehicle roof and a mounting cover engaged in the mounting hole to seal the luggage rack body.

In order to resolve the above-mentioned technical problems, the present disclosure further provides a vehicle roof luggage rack. The vehicle roof luggage rack may comprise a base body, a cover body covering the base body and comprising a top wall, a bottom wall contacted with the rubber seal strip and two opposite side walls connecting with the top and bottom walls, a fastener and a mounting cover. One of the side walls defines a mounting hole. The bottom wall may define an opening. The base body may comprise a pair of tips engaged in the cover body and a rubber seal strip connecting with the two tips and contacted with the bottom wall of the cover body, wherein the two tips are located at two opposite ends of the seal strip. The fastener may comprise a bolt extending through the opening of the bottom wall to fix the cover body on the roof of the vehicle. The mounting cover may be engaged in the mounting hole to seal the cover body.

In order to resolve the above-mentioned technical problems, the present disclosure further provides a vehicle with a roof luggage rack. The vehicle may comprise a vehicle roof; a luggage rack body defining a plurality of mounting holes and a plurality of openings, a plurality of fasteners corresponding to the mounting holes. Each of the fasteners may comprise a bolt extending through the luggage rack body from a corresponding opening to fix the luggage rack body on the vehicle roof and a plurality of mounting covers engaged in the mounting holes to seal the luggage rack body.

DETAILED DESCRIPTION

Below, technical proposals of embodiments of the present disclosure will be described clearly and completely with reference to the drawings of the embodiments. Apparently, the described embodiments are merely part of, rather than all of the embodiments of the present disclosure. Based on the described embodiments of the present disclosure, any other embodiments obtained by a person skilled in the art without paying creative efforts shall also fall within the scope of the present disclosure.

Figure 1:
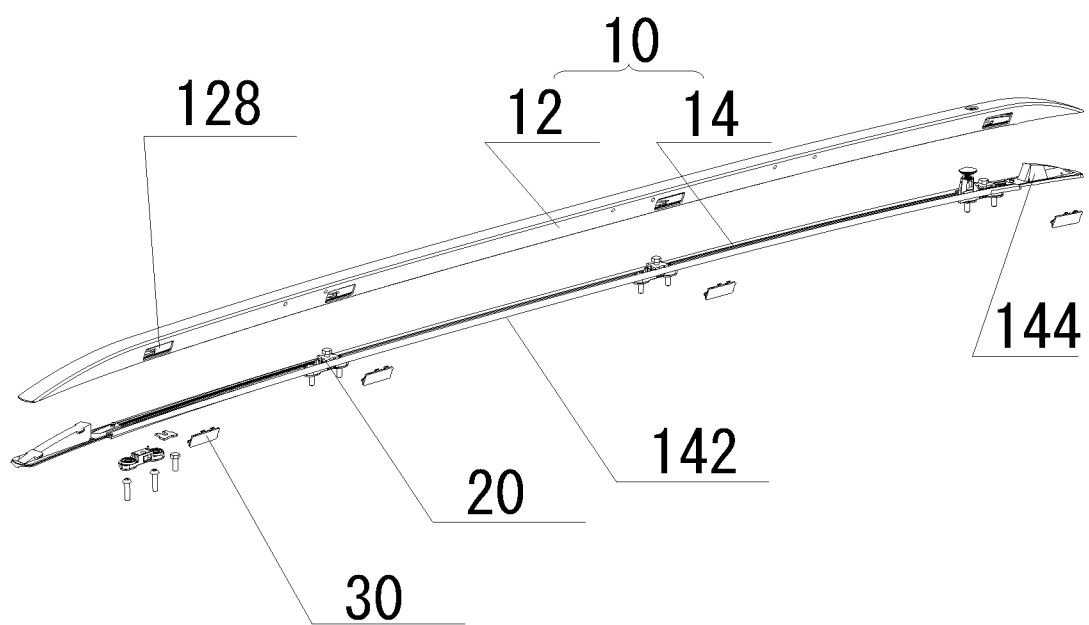
FIG. 1 is a perspective view of a roof luggage rack according to one embodiment of the present disclosure.
Figure 2:
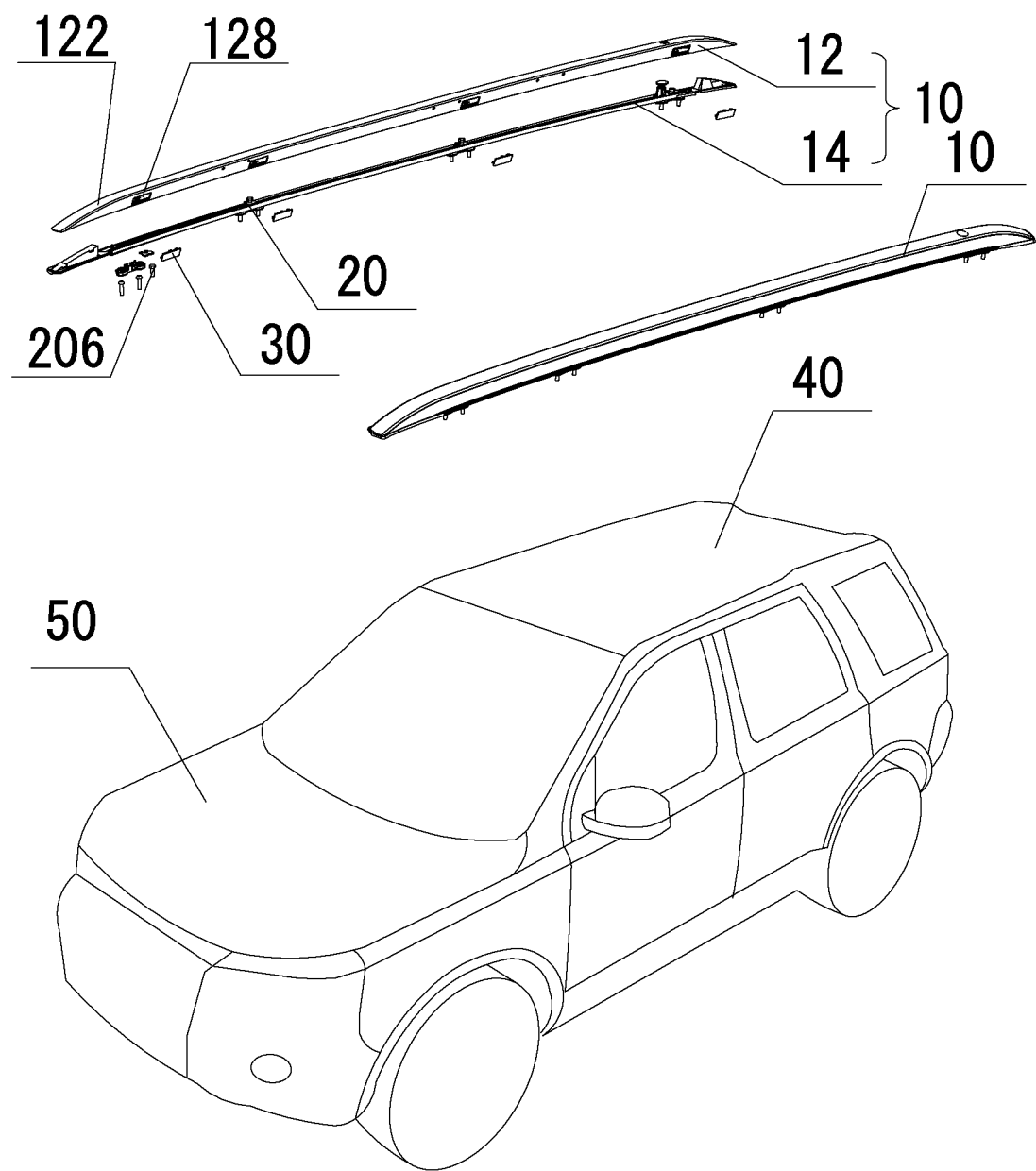
FIG. 2 is a disassembled perspective view of a vehicle with a roof luggage rack according to one embodiment of the present disclosure.

Referring to FIG. 1 and FIG. 2, a roof luggage rack may be mounted on a vehicle roof 40. The roof luggage rack may include a luggage rack body 10 defining a mounting hole 128, a fastener 20 fixing the luggage rack body 10 on the vehicle roof 40, and a mounting cover 30 engaged in the mounting hole 128 to seal the luggage rack body 10.

The rack luggage body 10 may be made of one or more kinds of the common materials such as stainless steel, aluminum alloy and high-strength plastic (nylon plus hybrid glass fiber).

A pair of luggage rack bodies 10 may be mounted on the vehicle roof 40 of a vehicle 50 by a plurality of fasteners 20. The vehicle 50 may be any vehicle, for example, a car, a pickup, an SUV, a passenger car and the like. The number of the fasteners 20 is equal to the number of the mounting holes 128. A position of each of the fasteners 20 corresponds to a position of each of the mounting holes 128. The luggage rack body 10 may include a base body 14 and a cover body 12 attached on the base body 14.

Figure 3:
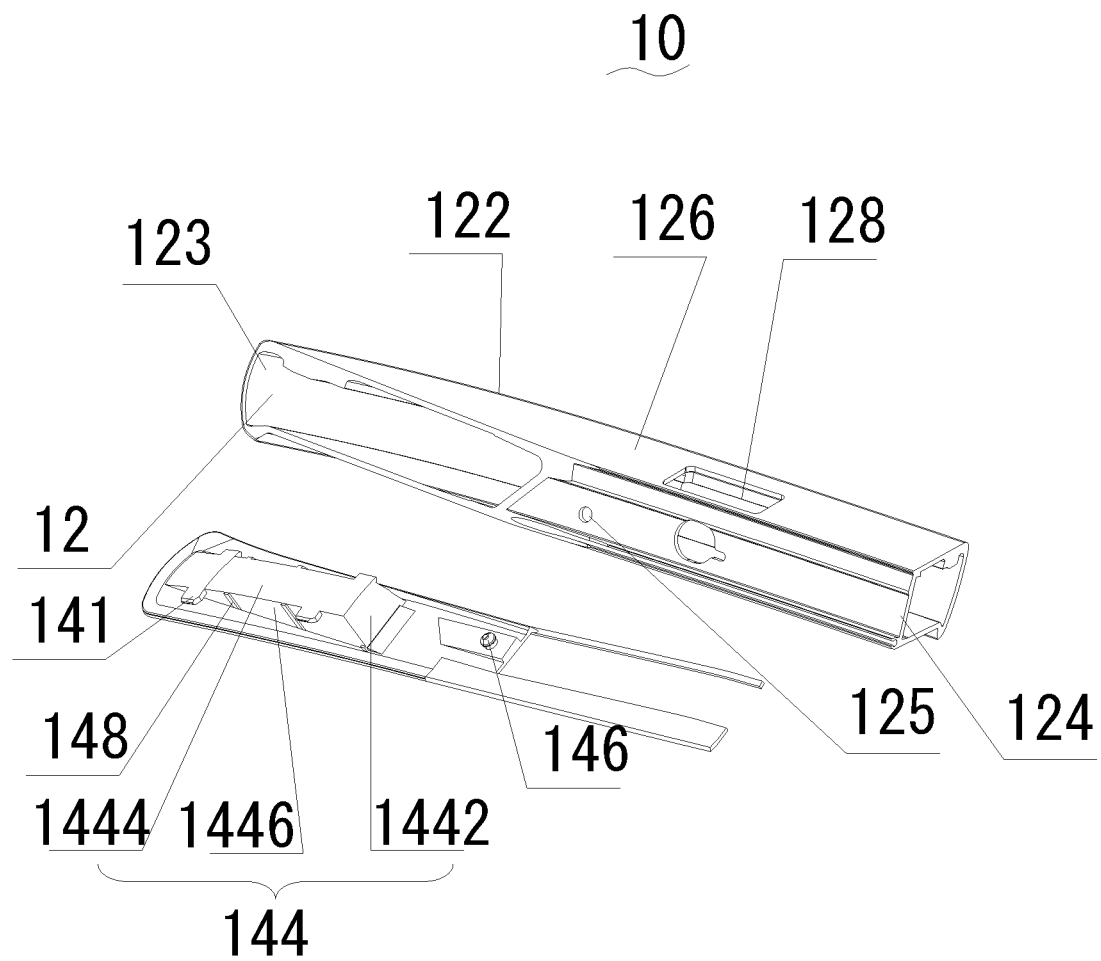
FIG. 3 is a partially enlarged disassembled perspective view of a cover body and a base body of the roof luggage rack body shown in FIG. 1.

Also referring to FIG. 3, the cover body 12 may include a top wall 122, a bottom wall 124 and two opposite side walls 126 connecting with the top and bottom walls 122, 124. Each of the two opposite ends of the top wall 122 may have an arced configuration. The mounting hole 128 may be defined in one of the side walls 126 for facilitating an entrance of a bolt 206 of the fastener 20. The bottom wall 124 of the cover body 12 may define a pair of openings 123 at two opposite ends along a length direction. The inner side walls 126 defining the mounting holes 128 may be located face-to-face and far away from the sight of an observer such that the observer cannot see the mounting holes 128 directly, which may make the entire roof luggage rack has an aesthetic appearance. The bottom wall 124 may define a positioning hole 125. The mounting hole 128 and the mounting cover 30 may be rectangular in shape. The number of the mounting holes 128 may be more than two. Alternatively, the shape of the mounting hole 128 and the mounting cover 30 may be circular, trapezoidal, or the like.

The base body 14 may include a bearing part 142 configured to support the bottom wall 124 of the cover body 12 and a pair of tips 144 connecting with the bearing part 142 at two opposite ends of the bearing part 142. The openings 123 may be configured to be oriented toward the tips 144 to receive the corresponding tips 144 therein. In one embodiment, the bearing part 142 may be a rubber seal strip contacted with the bottom wall 124 of the cover body 12 to prevent the roof 40 of the vehicle 50 from being scratched. The bearing part 142 can seal the cover body 12 to prevent external impurities from entering into the inside of the luggage rack body 10.

The tip 144 may have a triangle cross section and comprises a first wall 1442 extending from a top surface of the base body 14, a second wall 1444 extending from the top surface of the base body 14 and connecting with the first wall 1442 and the two lateral walls 1446 connecting with the top surface of the base body 14 and the first and second walls 1442, 1444. The two lateral walls 1446 may be substantially perpendicular to the top surface of the base body 14. The second wall 1444 may be inclined to the top surface of the base body 14. The shape of the tip 144 may be a cube or a cylinder and other regular or irregular shape.

The tip 144 may be made of plastic or rubber and further include at least one reinforcing rib 148 provided on each of the lateral walls 1446 of the tip 144. The reinforcing rib 148 can increase the strength of the tip 144 to prevent the tip 144 from being deformed by an external force. A plurality of tabs 141 may extend out from the second wall 1444 to engage with the cover body 12 in the opening 123.

The base body 14 may further include a positioning protrusion 146 located near the tip 144 and engaged in the positioning hole 125 to limit the movement of the cover body 12. The shape of the positioning protrusion 146 may be various, for example, it may be a cylinder or a cubic shape, and the positioning hole 125 of the cover body 12 corresponds to the shape of the positioning protrusion 146.

Figure 4:
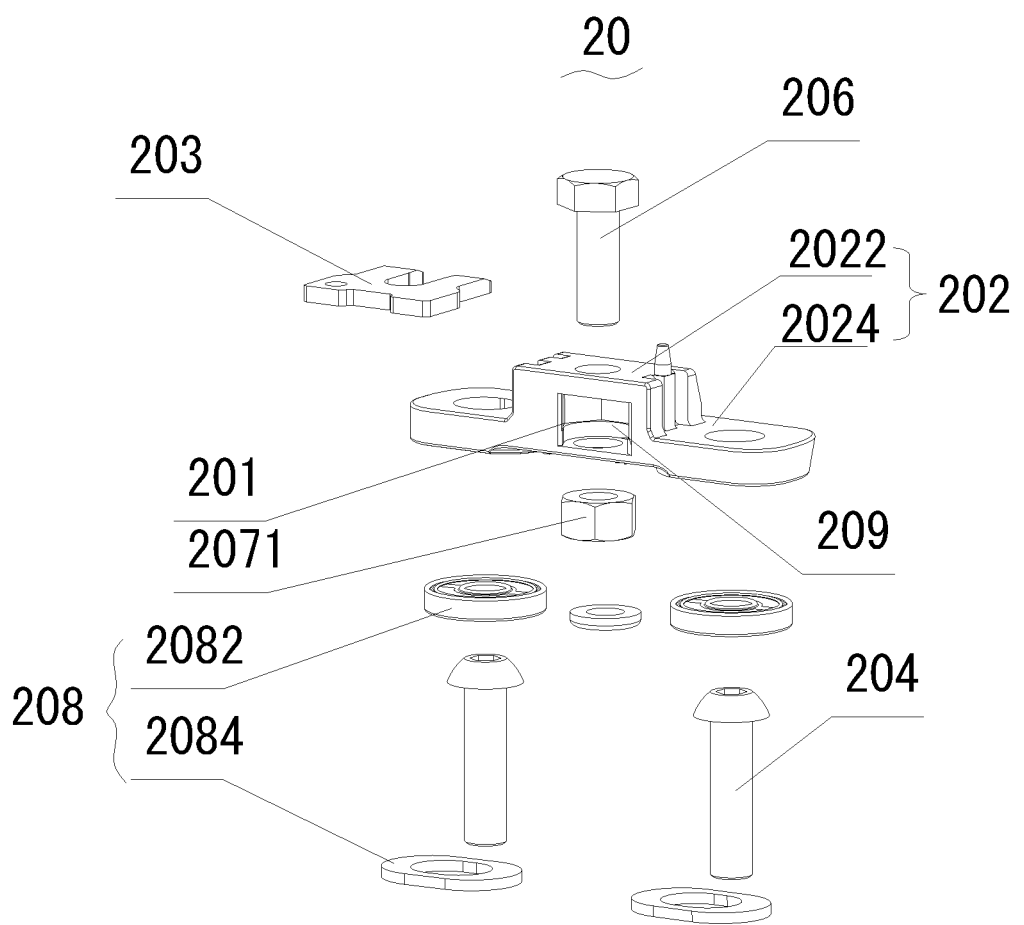
FIG. 4 is a disassembled perspective view of a fastener of the roof luggage rack shown in FIG. 1.
Figure 5:
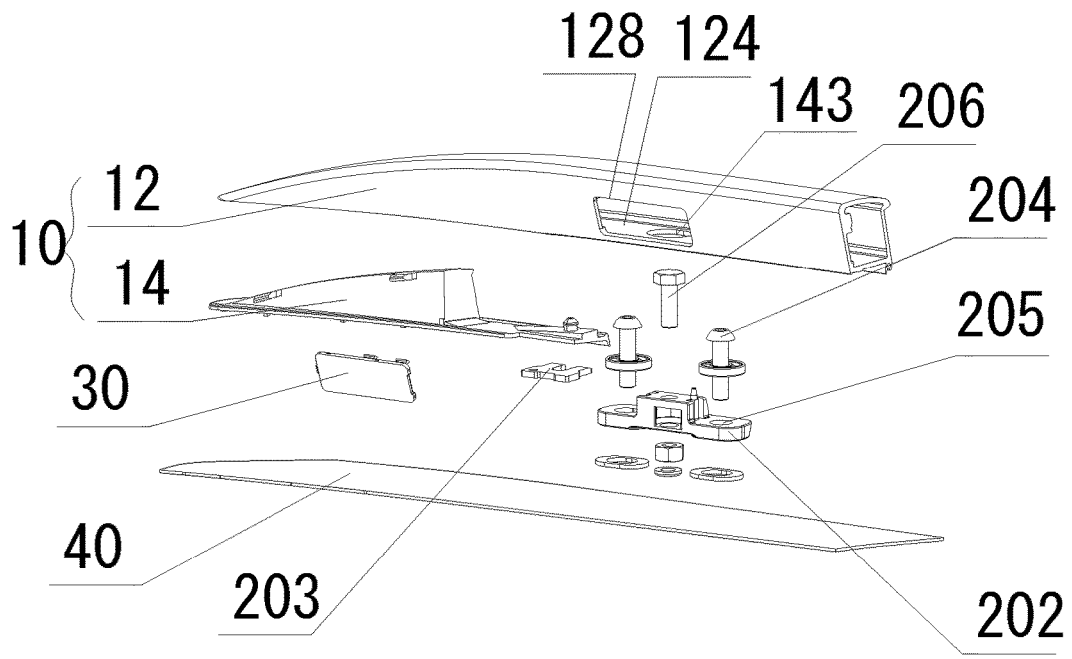
FIG. 5 is a partially enlarged disassembled perspective view of the roof luggage rack and a roof of a vehicle according to one embodiment of the present disclosure.
Figure 6:
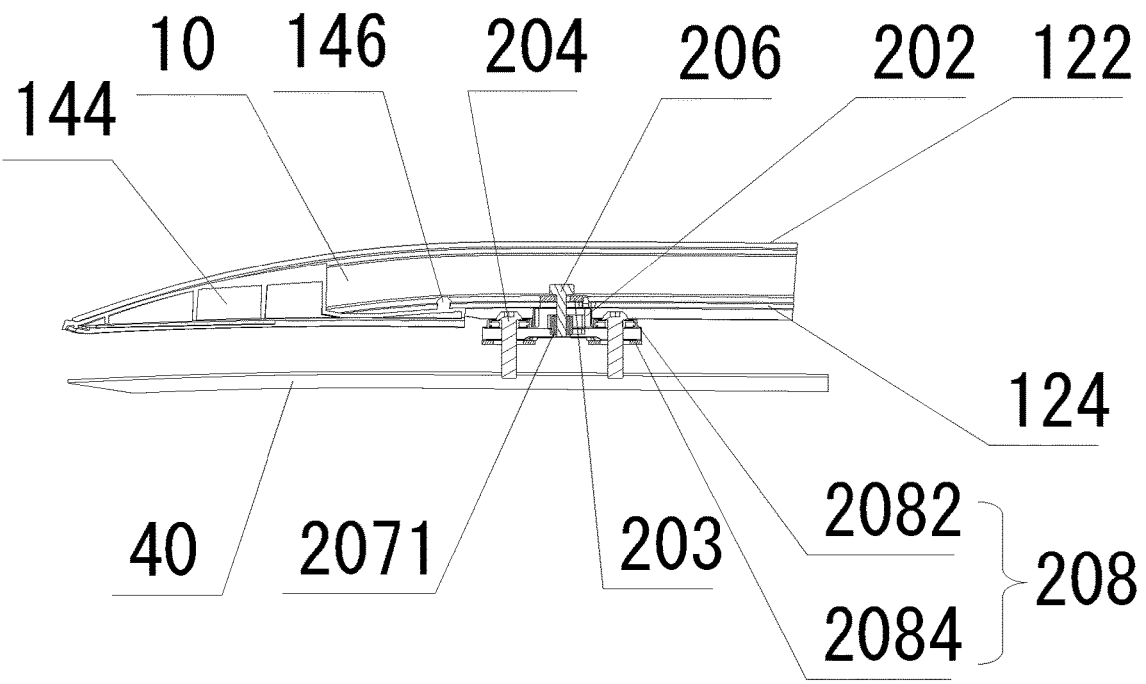
FIG. 6 is a partial assembled cross-sectional view of the roof luggage rack and the roof of the vehicle shown in FIG. 5.

Referring to FIGS. 4-6, the fastener 20 may include a mounting substrate 202, a pair of screws 204 and the bolt 206.

The mounting substrate 202 may include a protrusion 2022 and a pair of tabs 2024 located at two lateral sides of the protrusion 2022. The protrusion 2022 may define a receiving room 209 to receive a nut 2071. The screws 204 may extend through a pair of screw holes 205 in the tabs 2024 to fix the mounting substrate 202 on the roof 40 of the vehicle 50. The bolt 206 may first enter in a space between the top wall 122 and the bottom wall 124 from the mounting hole 128 and then extend through the bottom wall 124 of the cover body 12 and engages with the nut 2071 secured in the receiving room 209 of the mounting substrate 202 to fix the cover body 12 on the mounting substrate 202. In one embodiment, the nut 2071 may be a self-locking hexagonal nut.

In order to prevent water or any other impurities from entering into the interior of the roof luggage rack, the fastener 20 may further include a waterproof unit 208. The waterproof unit 208 may include a pair of waterproof cushions 2082 mounted between a cap of each of the screws 204 and each of the tabs 2024 and a pair of waterproof pads 2084 mounted between each of the tabs 2024 and the roof 40 of the vehicle 50.

In order to prevent the bolt 206 from loosening due to vibration, in one embodiment, the fastener 20 may include a fixing unit 203 provided between a cap of the bolt 206 and the bottom wall 124 of the cover body 12. Because the contacting area between the fixing unit 203 and the bottom wall 124 is larger than the contacting area between the cap of the bolt 206 and the bottom wall 124, the frictional force between the fixing unit 203 and the bottom wall 124 is larger than the frictional force between the top of the bolt 206 and the bottom wall 124, thereby preventing the bolt 206 from rotating or moving.

Optionally, the fixing unit 203 may be a U-shaped washer, and has a U-shaped opening for easy operation.

During assembly, the screws 204 extend through the waterproof cushions 2082, a pair of screw holes 205 in the tabs 2024 and the waterproof pads 2084 to fix the mounting substrate 202 on the vehicle roof 40.

The self-locking hexagonal nut 2071 is inserted into the receiving room 209 inside the mounting substrate 202 through an opening 201 defined in the protrusion 2022 of the mounting substrate 202. In order to make the self-locking hexagonal nut 2071 cannot rotate in the receiving room 209 when installing the bolt 206, the size of the receiving room 209 is the same as that of the self-locking hexagonal nut 2071 or the size of the receiving room 209 is slightly larger than the size of the self-locking hexagonal nut 2071.

When the cover body 12 is attached to the base body 14, the bolt 206 is inserted into the roof luggage rack body 10 via the mounting hole 128. The bolt 206 extends through a through hole 143 in the bottom wall 124 of the cover body 12. The U-shaped washer 203 is put between the cap of the bolt 206 and the bottom wall 124 of the roof luggage rack body 10. Thus, the luggage rack body 10 is secured on the mounting substrate 202.

Finally, the mounting cover 30 is engaged in the mounting hole 128. Thus, external impurities can be prevented from entering the luggage rack body 10 and the roof luggage rack has aesthetic appearance.

The above description merely depicts some exemplary embodiments of the disclosure, but is not limiting the scope of the disclosure. Any equivalent structure or flow transformations made to the disclosure, or any direct or indirect applications of the disclosure on any other related fields, shall all be covered within the protection of the disclosure.

What is claimed is:

1. A roof luggage rack for a vehicle, comprising:
a luggage rack body defining a mounting hole;
a fastener fixing the luggage rack body on the vehicle roof; and
a mounting cover engaged in the mounting hole to seal the luggage rack body;
wherein the luggage rack body comprises a base body and a cover body attached on the base body;
wherein the cover body comprises a top wall, a bottom wall and two opposite side walls connecting with the top and bottom walls, the mounting hole is defined in one of the side walls;
wherein the base body comprises a bearing part configured to support the bottom wall of the cover body and a pair of tips connecting with the bearing part at two opposite ends of the bearing part;
the bottom wall of the cover body defines an opening oriented toward a corresponding tip, the corresponding tip is engaged in the opening;
wherein the tip has a triangle cross section; the tip comprises a first wall extending from a top surface of the base body, a second wall extending from the top surface of the base body and connecting with the first wall and two lateral walls connecting with the top surface of the base body and the first and second walls; the two lateral walls are perpendicular to the top surface of the base body; the second wall is inclined to the top surface of the base body.

2. The roof luggage rack of claim 1, wherein each of two opposite ends of the top wall of the cover body has an arced configuration.

3. The roof luggage rack of claim 1, wherein the bearing part is a rubber seal strip.

4. The roof luggage rack of claim 1, wherein at least one reinforcing rib is provided on the lateral walls of the tip; a plurality of tabs extend out from the second wall to engage with the cover body in the opening.

5. The roof luggage rack of claim 1, wherein a positioning protrusion located near the tip is provided on the base body, a positioning hole is defined in the bottom wall, and the positioning protrusion is engaged in the positioning hole.

6. The roof luggage rack of claim 1, wherein the fastener comprises a mounting substrate, a pair of screws and a bolt, the screws are configured to fix the mounting substrate on the roof of the vehicle, the bolt extends through the bottom wall of the cover body and engages with a nut secured in the mounting substrate to fix the cover body on the mounting substrate.

7. The roof luggage rack of claim 6, wherein the mounting substrate comprises a protrusion and a pair of tabs located at two lateral sides of the protrusion, the protrusion defines a receiving room to receive the nut;
the fastener further comprises a waterproof unit comprising a pair of waterproof cushions and a pair of waterproof pads, each waterproof cushion is sandwiched between a corresponding one of the screws and a corresponding one of the tabs, each waterproof pad is sandwiched between a corresponding one of the tabs and the roof of the vehicle.

8. The roof luggage rack of claim 6, wherein the fastener further comprises a fixing unit provided between a cap of the bolt and the bottom wall of the cover body.

9. The roof luggage rack of claim 8, wherein the fixing unit is a U-shaped washer.

10. The roof luggage rack of claim 1, further comprising a plurality of fasteners, wherein the luggage rack body defines a plurality of mounting holes, the number of the fasteners is equal to the number of the mounting holes, a position of each of the fasteners corresponds to a position of each of the mounting holes.

11. A vehicle roof luggage rack, comprising:
a base body comprising a pair of tips and a rubber seal strip connecting with the two tips, wherein the two tips are located at two opposite ends of the rubber seal strip;
a cover body covering the base body and comprising a top wall, a bottom wall contacted with the rubber seal strip and two opposite side walls connecting with the top and bottom walls, wherein one of the side walls defines a mounting hole, the bottom wall defines two openings, each tip is engaged in a corresponding one of the openings;
a fastener comprising a bolt extending through the through hole of the bottom wall to fix the cover body on the vehicle roof; and
a mounting cover engaged in the mounting hole to seal the cover body;
wherein the tip has a triangle cross section; the tip comprises a first wall extending from a top surface of the base body, a second wall extending from the top surface of the base body and connecting with the first wall and two lateral walls connecting with the top surface of the base body and the first and second walls; the two lateral walls are perpendicular to the top surface of the base body; the second wall is inclined to the top surface of the base body.

12. The roof luggage rack of claim 11, further comprising a plurality of fasteners, wherein the cover body defines a plurality of mounting holes, the number of the fasteners is equal to the number of the mounting holes, a position of each of the fasteners corresponds to a position of each of the mounting holes.

13. A vehicle with a roof luggage rack, comprising:
a vehicle roof;
a luggage rack body defining a plurality of mounting holes and a plurality of openings;
a plurality of fasteners corresponding to the mounting holes, wherein each of the fasteners comprises a bolt extending through the luggage rack body from a corresponding opening to fix the luggage rack body on the vehicle roof; and
a plurality of mounting covers, engaged in the mounting holes to seal the luggage rack body;
wherein the luggage rack body comprises a base body and a cover body attached on the base body;
wherein the cover body comprises a top wall, a bottom wall and two opposite side walls connecting with the top and bottom walls, the mounting hole is defined in one of the side walls;
wherein the base body comprises a bearing part configured to support the bottom wall of the cover body and a pair of tips connecting with the bearing part at two opposite ends of the bearing part;
the bottom wall of the cover body defines an opening oriented toward a corresponding tip, the corresponding tip is engaged in the opening;
wherein the tip has a triangle cross section; the tip comprises a first wall extending from a top surface of the base body, a second wall extending from the top surface of the base body and connecting with the first wall and two lateral walls connecting with the top surface of the base body and the first and second walls; the two lateral walls are perpendicular to the top surface of the base body; the second wall is inclined to the top surface of the base body.

14. The vehicle of claim 13, wherein the fastener comprises a mounting substrate, a pair of screws, a bolt, the screws are configured to fix the mounting substrate on the vehicle roof, the bolt extends through the luggage rack body from a corresponding opening and engages with a nut secured in the mounting substrate to fix the luggage rack body on the mounting substrate.

15. The vehicle of claim 14, wherein the fastener further comprises a fixing unit provided between a cap of the bolt and the bottom wall of the cover body.

* * * * *